Figure 1:
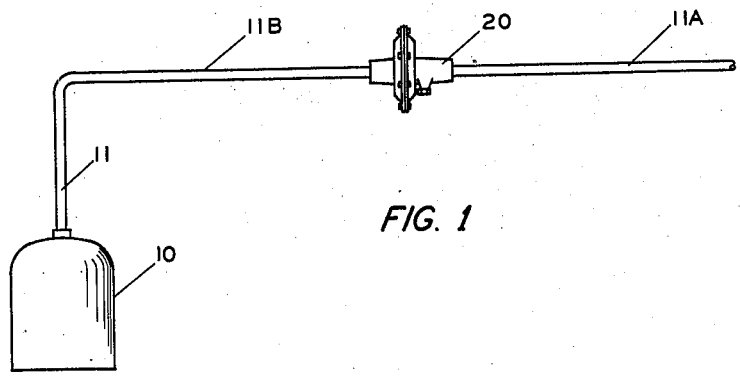

Oct. 29, 1940.  G. R. BENZ ET AL  2,219,408
AUTOMATIC VALVE
Filed July 22, 1937

INVENTOR.
GEORGE R. BENZ
CHARLES MAC SPORRAN
BY
*Hudson, Conner, Young and Shewley*
ATTORNEYS.

Patented Oct. 29, 1940

2,219,408

UNITED STATES PATENT OFFICE 2,219,408

AUTOMATIC VALVE

George R. Benz and Charles MacSporran, Detroit, Mich., assignors to Phillips Petroleum Company, a corporation of Delaware Application July 22, 1937, Serial No. 155,134

3 Claims. (Cl. 137—153)

This invention relates to an improved automatic valve, and in particular to an automatic valve for shutting off a flow of fluid therethrough when the said flow increases above normal.

The object of this invention is to provide an improved automatic valve for the flow therethrough of a fluid which will function to shut off such flow when it becomes increased above normal.

The object of this invention is to provide an improved automatic valve for the flow therethrough of a fluid which will function to shut off such flow when the difference between the fluid pressure on the inlet and the fluid pressure on the outlet exceeds that for which the valve was normally intended.

Another object of this invention is to provide an improved automatic valve for the flow therethrough of a fluid under pressure which will function to shut off such flow when the pressure of the fluid entering one side of the valve for flow therethrough becomes greater than the pressure on the fluid leaving the valve.

Another object of this invention is to provide an improved automatic valve for the flow therethrough of a fluid under pressure which will function to shut off such flow when the pressure of the fluid leaving the valve becomes less than the pressure on the fluid entering the valve.

Another object of this invention is to provide an improved automatic valve for the flow therethrough of a fluid under pressure which will function to shut off such flow when the pressure of the fluid entering one side of the valve for flow therethrough becomes greater or materially greater than the pressure on the fluid leaving the valve, and to further provide such a valve with means for adjusting it to shut off at varying rates of fluid flow.

Another object of this invention is to provide an improved automatic valve for the flow therethrough of a fluid under pressure which will function to shut off such flow when pressure of the fluid leaving one side of the valve from flow therethrough has become less or materially less than the pressure on the fluid entering the valve, and to further provide such a valve with means for adjusting it to shut off at varying rates of fluid flow.

Another object of this invention is to provide an improved automatic valve for the flow therethrough of a fluid under pressure, which valve is designed to be interposed in a conduit for carrying such fluid, and which will function to automatically close and shut off the flow of fluid therethrough when the pressure of the fluid entering the valve becomes greater or materially greater than the pressure on the fluid leaving the valve, and which will function to automatically open and permit the flow of fluid through the said valve again when the pressure of the fluid entering and the pressure of the fluid leaving the valve have approached an equal or substantially equal condition.

Another object of this invention is to provide an improved automatic valve for the flow therethrough of a fluid under pressure, which valve is designed to be interposed in a conduit for carrying such fluid, and which will function to automatically close and shut off the flow of fluid therethrough when the pressure of the fluid leaving the valve has become less or materially less than the pressure on the fluid entering the valve, and which will function to automatically open and permit the flow of fluid through said valve again when the pressure of the fluid leaving and the pressure of the fluid entering the valve have approached an equal or substantially equal condition.

This invention is not to be limited otherwise than by the appended claims, and is not to be limited for use with any particular fluid, or particular apparatus, or limited for use in any particular industry or art, but its application is universal wherever it is desired to utilize a valve capable of performing as recited above in the objects.

However such an improved automatic valve as constitutes this present invention is especially adapted to be interposed in a pipe line or other conduit used to convey a fluid under pressure from a reservoir, vessel, or other suitable container to the point of consumption of said fluid. And while it is to be understood that the valve comprising this invention is not to be limited to any particular or single use, it will however for the purposes of describing and explaining its structure and function, be described in conjunction with the dispensing of a fluid under pressure, such as liquefied petroleum gases of the type used as industrial and domestic fuel.

Figure 2:
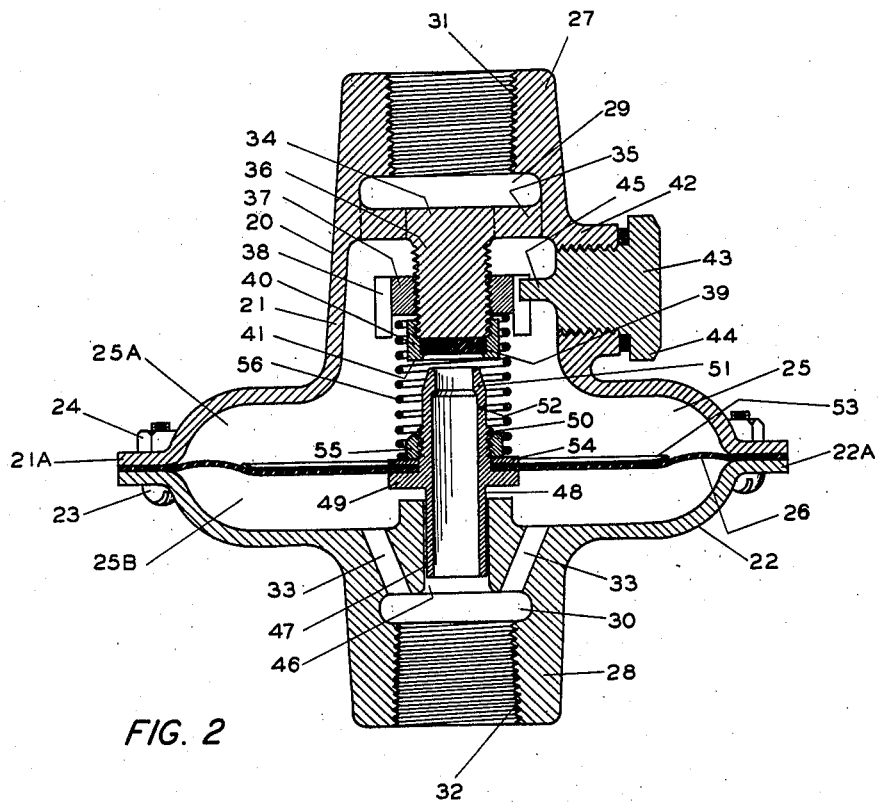

Other objects and advantages of this invention will be appreciated from a consideration of the following detail specification, and the attached drawing, which forms a part of said specification, and in which drawing;

Fig. 1 is a side view of the improved automatic valve illustrated as interposed in a pipe connected to a container; and, Fig. 2 is a cross-sectional view of the improved automatic valve taken on the longitudinal axis thereof.

With reference now to Fig. 1, therein is illustrated a container 10 of any suitable type, size or construction, but preferably one designed to contain a fluid under pressure, which has leading therefrom a pipe 11, or any other suitable type of conduit, which has interposed therein an improved automatic valve 20 of the type constituting this present invention, and the structure and function of which will herein be fully described and explained.

Assuming that the container 10 contains a highly inflammable fluid under pressure such as liquefied petroleum gases of the type used as fuel, and that the conduit 11 leads to various appliances for consuming such fuel, and that from any cause a break or leak occurs in any part of the portion 11—A of the pipe 11, then under such circumstances the flow of the fluid through the pipe 11, including the portions 11—A and 11—B thereof would under normal circumstances become increased, and under these conditions the pressure on the fluid in pipe portion 11—B would be greater than the pressure on pipe portion 11—A by virtue of the break or leak therein, and the automatic valve 20 would then function to shut off further flow therethrough until the break in pipe portion 11—A could be mended at which time the valve 20 would automatically open to permit continued flow of fluid through pipe 11.

With reference now to Fig. 2 wherein the improved automatic valve is shown in a cross-sectional view taken on the longitudinal axis of the same, it will be appreciated that the valve is formed with a housing 20 which comprises the complementary hollow casings 21 and 22 formed with flanges 21—A and 22—A and retained in place by means of the bolts 23 provided with the nuts 24. Formed between the complementary hollow casings is a main chamber 25 which is divided by means of a flexible diaphragm 26, retained between the flanges 21—A and 22—A, into the several chambers 25—A and 25—B formed substantially within the complementary hollow casings 21 and 22 respectively. Each of the hollow casings 21 and 22 are formed with reduced neck portions 27 and 28 in which are formed the reamed out chambers 29 and 30, and the screw threaded ports 31 and 32 constituting an outlet and inlet respectively, which screw threaded ports are utilized to connect the valve housing and the valve assembly therein, which will later be described, into a pipe or conduit of the type 11 as illustrated in Fig. 1.

Communicating with the port 32 and the chamber 30 of the casing portion 22 are a plurality of ports 33 which communicate with the chamber 25—B.

The hollow casing 21 has positioned in the neck portion 27 thereof a spider 34 in which is formed a plurality of ports such as the one designated by the reference numeral 35. The spider 34 is formed with a screw thread stub or shaft 36 upon which is rotatably mounted the screw threaded nut or spring retainer 37 provided with ribs 38 spaced about the sides thereof, and the purpose and function of which will hereinafter be described. Upon the end of the stub 36 is positioned a sealing member or composition disc 39, formed of any suitable relatively resilient yet durable material, and which is retained in position by the nut 40 provided with the flange 41.

The hollow casing 21 is formed with an internally screw threaded boss portion or aperture 42 within which fits a screw threaded plug 43 provided with the head 44 and an extension 45 formed on the end of the plug and adapted to extend into the interior of the valve housing for contact with the ribs 38 formed on the nut 37 for the purpose of preventing rotation of said nut upon the stub.

Within the hollow casing 22, and adjacent the ports 33, there is provided the port 46 and a guide or bearing 47 in which there is slidably mounted a portion of the hollow tube 48 which is formed with the flange 49, the screw thread portion 50 and a valve seat 51, and which is further provided with an aperture 52 in the side thereof which is of a relatively minute diameter. The tube 48 passes through an aperture located centrally of the diaphragm 26 and the diaphragm rests upon the flange 49. Superimposed upon the diaphragm 26 and also supported by the flange 49 of the tube 48, there is a diaphragm plate 53, of a lesser diameter than the first mentioned diaphragm and which is made of a rigid material such as of a thin sheet of metal, and which is also provided with an aperture located centrally thereof through which passes the tube 48. A washer or retaining ring 54 of any relatively thin rigid material is inserted over one end of the tube 48 and placed in contact with the diaphragm 53, and together with the aid of the nut 55 serves to press the diaphragms 53 and 26 against the flange 49 of the tube 48 and otherwise hold them securely in place.

A coil spring 56 is slipped over the tube 48 and one end thereof seats or rests against the nut 37 and the other against the ring 54 and thereby normally serves to maintain the valve seat 51 out of contact with the disc 39, thereby allowing free passage of fluid entering the screw threaded port 32 to flow into the reamed out chamber 30 and through the tube 48 and out through valve seat 51 thereof into the chamber 25—A, and from there through the ports 35 and into the chamber 29 and thence out through the screw threaded port 31.

Under normal conditions, when the above described valve is inserted in a pipe or line through which a fluid, or a fluid under pressure, is flowing, the fluid will enter by way of screw threaded port 32 and, as just described, pass through the valve and make its exit by way of port 31. However, during such normal passage of the fluid under pressure through the valve, a portion of the fluid will pass from the port 32 and chamber 30 through the plurality of ports 33 and into the chamber 25—B and therein exert a pressure or force on the lower side of the diaphragm 26 equal to the pressure at which the fluid enters the port 32. And under normal conditions the spring 56 by forcing against the nut 37 and ring 54 will serve to keep the valve seat 51 out of contact with the disc 39, so that free passage of fluid through the valve is possible, and at such times the pressure of the fluid in the chamber 25—A and that fluid leaving port 31 will be substantially equal to the pressure of the fluid in chamber 25—B and that of the fluid entering port 32.

When, from any cause, the pressure of the fluid in chamber 25—A and the pressure of the same fluid leaving port 31 becomes less than the pressure of the fluid entering port 32 and the pressure of the same fluid in chamber 25—B, which by virtue of the ports 33 will be the same pressure as that entering port 32, the valve here described will function to shut off further flow of fluid through tube 48. Such shutting off of the fluid flow is caused by virtue of the pressure differential existing between the fluid in chamber 25—A and that in 25—B in which last chamber the pressure thereof acting on the under side of the diaphragm 26 will be sufficient to counteract the force of the pressure acting on the upper side of the same diaphragm plus the force of the spring 56 tending to hold the valve seat 51 out of contact with the disc 39, and the pressure in chamber 25—B acting on the lower side of diaphragm 26 will then force the same upwardly, against the action of spring 56 and the pressure in chamber 25—A, together with the diaphragm 53 and the tube 48 connected thereto until the valve seat 51 seats upon the disc 39 thereby preventing further flow of fluid through the valve.

It will be appreciated that by the removal of the plug 43 any conveniently sized tool may be inserted through the boss 42 to contact the ribs 38 of the nut 37 and thereby turn the same to move it to any desired position along the length of the stub 36 to adjust the tension on spring 56 so as to set and control the spring so that it will function as described to be overcome by varying pressure conditions in the chamber 25—B to seat valve seat 51 on the disc 39 and prevent flow of fluid through the valve.

Under such conditions as will force the valve seat 51 in contact with disc 39 to prevent flow of fluid through the valve, a relatively minute amount of fluid flow or bleeding is permitted and desirable, and is effected by virtue of the small port 52 through which a small amount of fluid may pass or bleed into chamber 25—A and ultimately flow through port 31. This bleeding of a small amount of fluid through port 52 is particularly desirable under such circumstances where a conduit or pipe connected to port 31 has become broken or has developed a leak and under which circumstances the valve seat 51 will seat against the disc 39 as described, but after the pipe or leak has been mended the bleeding or escape of fluid through port 52 and into the chamber 25—A and through port 31 and the line or pipe connected thereto will continue until ultimately the pressure in both the chambers 25—A and 25—B positioned respectively on the upper and lower sides of the diaphragm 26, is equal, or substantially equal, and the pressure on the lower side of the diaphragm in chamber 25—B is no longer sufficient to maintain the valve seat 51 against the disc 39, at which time the spring 56 will function to unseat the valve seat 51 from the disc 39 and permit the continued passage of fluid through the valve.

We claim:

1. A valve, comprising a pair of complementary casings having a main chamber formed therebetween, a flexible diaphragm retained by said complementary casings dividing said main chamber into an upper and a lower chamber each disposed within one of said casings, a stub formed within the casing having the upper chamber disposed therein and provided with a screw threaded nut rotatably and movably positioned thereon and a disc mounted on the end of said stub, a tube extending through said diaphragm and forming a passage between said upper and lower chambers and including a valve seat disposed adjacent said disc and adapted to make contact therewith to close said passage, a spring disposed in said upper chamber acting between said nut and said diaphragm to normally hold said valve seat out of contact with said disc and permit passage from said lower to said upper chamber, an aperture formed adjacent said nut in the casing having the upper chamber disposed therein, a screw threaded plug for normally closing said aperture formed with an extension on the end thereof for projection into said casing and contact with said nut to hold it in set position, after positioning thereof on said stub to control the tension of said spring.

2. An excess flow valve comprising a housing having an inlet and an outlet, a flexible diaphragm dividing the interior of the housing into an inlet chamber and an outlet chamber, a tube secured in the diaphragm defining a passage therethrough, a portion of the tube projecting into each chamber, a valve seat on one said portion of the tube, a sealing member fixedly mounted in the associated chamber in alignment with and spaced from the valve seat for coaction therewith on extreme movement of the diaphragm due to excess flow conditions to close the passage, a stub supporting the sealing member, a spring retainer mounted on the stub, a spring between the spring retainer and the diaphragm urging the valve seat away from the sealing member, the spring retainer being movable on the stub to adjust the action of the spring, and a guide in the other chamber having a sliding fit with the other said portion of the tube to maintain the valve seat and sealing member in alignment on movement of the diaphragm.

3. An excess flow valve comprising a housing having an inlet and an outlet, a flexible diaphragm dividing the interior of said housing into an inlet chamber and an outlet chamber, an opening in said diaphragm placing said chambers in communication, a valve seat associated with said opening, a sealing member fixedly mounted in one of the chambers in alignment with and spaced from the valve seat for coaction therewith on extreme movement of the diaphragm to close the opening, a screw threaded stub in one of the chambers, a spring retainer screw threadly mounted on the stub, a spring between the retainer and the diaphragm urging the valve seat away from the sealing member, an aperture in the housing adjacent the spring retainer, and a removable closure in said aperture having a projection for engaging the spring retainer to prevent substantial movement of the same.

GEORGE R. BENZ.
CHARLES MacSPORRAN.